US012436022B2

United States Patent
Matsumoto et al.

(10) Patent No.: US 12,436,022 B2
(45) Date of Patent: Oct. 7, 2025

(54) AUTOMATED IN-PLACE WEIGHING OF VIALS IN TUBE RACKS

(71) Applicant: BioNex Solutions, Inc., San Jose, CA (US)

(72) Inventors: David K. Matsumoto, San Jose, CA (US); Eric James Rollins, Los Gatos, CA (US); Thomas Patrick Grimley, South Bend, IN (US)

(73) Assignee: BioNex Solutions, Inc., San Jose, CA (US)

( * ) Notice: Subject to any disclaimer, the term of this patent is extended or adjusted under 35 U.S.C. 154(b) by 435 days.

(21) Appl. No.: 18/090,367

(22) Filed: Dec. 28, 2022

(65) Prior Publication Data

US 2023/0204408 A1    Jun. 29, 2023

Related U.S. Application Data

(60) Provisional application No. 63/294,328, filed on Dec. 28, 2021.

(51) Int. Cl.
*G01G 21/22* (2006.01)
*G01G 21/28* (2006.01)

(52) U.S. Cl.
CPC ............. *G01G 21/22* (2013.01); *G01G 21/28* (2013.01)

(58) Field of Classification Search
CPC ....... G01G 21/22; G01G 21/28; G01G 13/006
USPC .............................................................. 177/1
See application file for complete search history.

(56) References Cited

U.S. PATENT DOCUMENTS

| | | | | |
|---|---|---|---|---|
| 4,807,421 A * | 2/1989 | Araki | ...................... | A23B 2/22 269/254 R |
| 5,468,110 A * | 11/1995 | McDonald | .......... | G07F 17/0092 414/268 |
| 5,593,267 A * | 1/1997 | McDonald | .......... | G07F 17/0092 414/280 |
| 6,898,549 B1 * | 5/2005 | Sawafta | ............. | G01N 35/0099 702/175 |
| 9,052,228 B2 * | 6/2015 | Sollazzo Lee | ....... | G01G 13/026 |

(Continued)

FOREIGN PATENT DOCUMENTS

| | | | | |
|---|---|---|---|---|
| JP | 2004503742 | * | 2/2004 | |
| JP | 7244471 B2 | * | 3/2023 | ............. B65G 29/02 |
| WO | WO 2014/072019 A2 | | 5/2014 | |

OTHER PUBLICATIONS

PCT International Search Report and Written Opinion, PCT Application No. PCT/US2022/054202, May 12, 2023, 12 pages.

*Primary Examiner* — Jacques M Saint Surin
(74) *Attorney, Agent, or Firm* — Fenwick & West LLP

(57) ABSTRACT

An apparatus for weighing containers comprises a stage configured to support a receptacle for securing one or more containers and a singulation post comprising a vertical element positioned below the stage. The singulation post is aligned with and configured to displace a single one of the containers within the receptacle in an upward vertical direction as the stage is translated in a downward vertical direction towards the singulation post. The singulation post is coupled to a load cell configured to measure a weight of the single displaced container while the vertical element of the singulation post contacts the container. The apparatus further comprises a controller for actuating the stage in the vertical directions and for recording a weight of the container measured by the load cell.

17 Claims, 11 Drawing Sheets

(56) References Cited

U.S. PATENT DOCUMENTS 10,031,149 B2 * 7/2018 Lapham ............. G01N 35/0099
2018/0292425 A1 * 10/2018 Lapham ............... B25J 15/0658

* cited by examiner

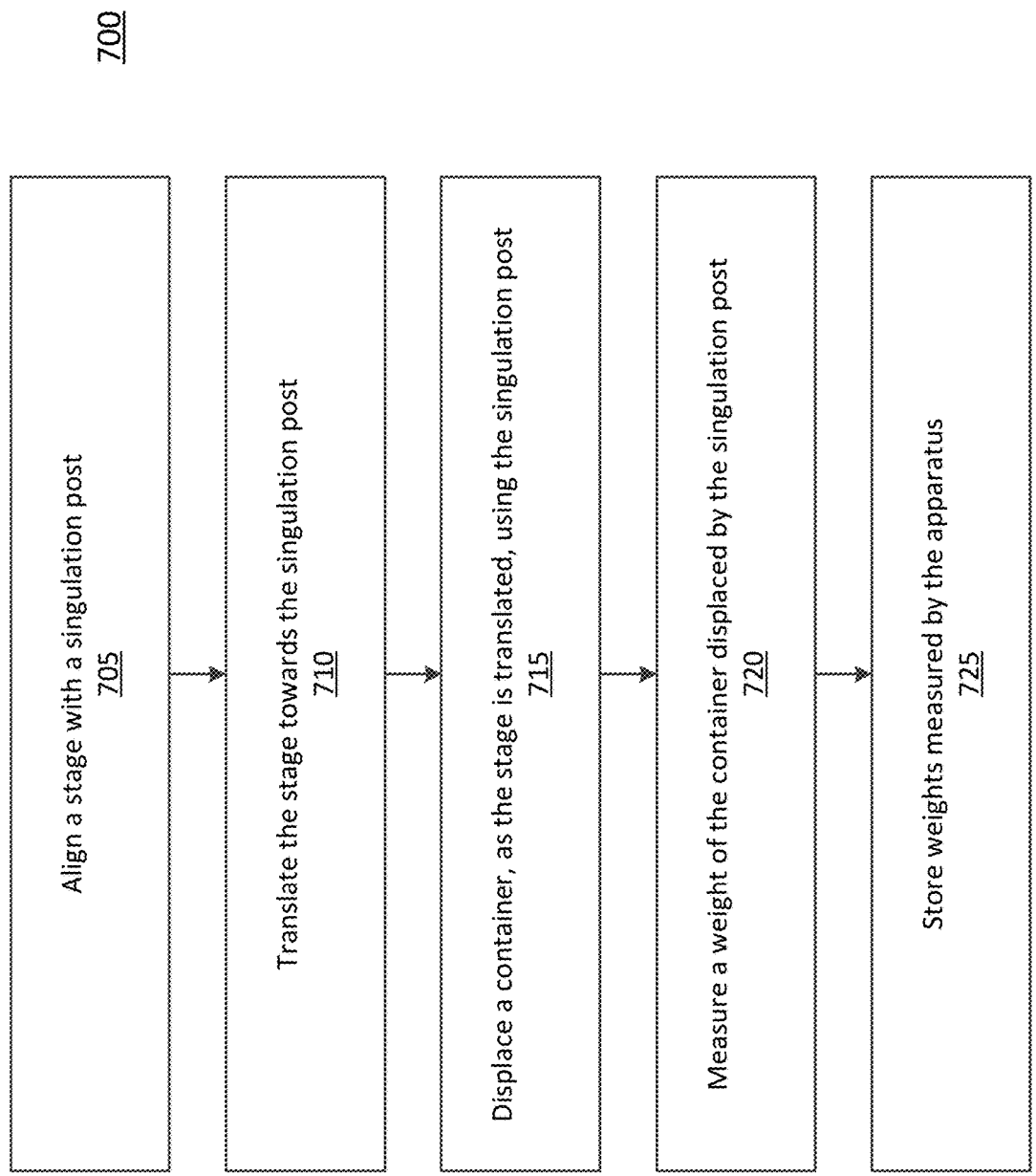

AUTOMATED IN-PLACE WEIGHING OF VIALS IN TUBE RACKS

CROSS REFERENCE TO RELATED APPLICATIONS

This application claims the benefit of U.S. Provisional Application No. 63/294,328, filed Dec. 28, 2021, which is incorporated by reference in its entirety.

BACKGROUND

This disclosure relates generally to an apparatus for weighing containers and more specifically to an apparatus for the automated in-place weighing of containers in holders.

Automating laboratory techniques are essential to performing efficient, high-throughput analysis of materials in a short period of time. Robotics devices in laboratories use control mechanisms to transfer liquids or other materials within or across different containers, for example from well to well in microtiter plates or from vial to vial in tube racks that hold the vials. Many laboratory techniques additionally involve measuring the weight of contents within the containers. Conventional systems weigh containers such as vials or tubes using robotic arms or grippers attached to a robotic instrument that remove the individual tubes from a tube rack and move them to a weighing device or scale. However, such movement increases the process cycle time of the operations of the robotic instrument, which increase the amount of time needed to run the experiment. Such conventional systems also risk dropping or breaking the container during the movement.

SUMMARY

A container weighing apparatus and method addresses limitations of conventional measuring systems by automatically weighing individual containers without requiring movement of each container out of its receptacle. As a result, the disclosed container weighing apparatus minimizes the risk of dropping individual containers, breaking the containers, or losing samples within the containers. The disclosed container weighing apparatus further avoids risk of a container being removed from its compartment in a receptacle during measurement and being returned to the wrong compartment in the receptacle. The disclosed container weighing apparatus additionally minimizes the operation time needed to measure a container or a sample within a container because it avoids individually moving each container to a separate weighing device.

In one embodiment, the container weighing apparatus comprises a stage, a singulation post, a load cell, and a controller. The stage is configured as a platform to support a receptacle for securing one or more containers. The singulation post comprises a vertical element positioned below the stage. The singulation post is aligned with and configured to displace a single one of the containers within the receptacle in an upward vertical direction as the stage is translated in a downward vertical direction towards the singulation post. The load cell is coupled to the singulation post. The load cell is configured to measure a weight of the single one of the containers displaced by the singulation post while the vertical element contacts the container. The controller is configured to actuate the stage in the downward vertical direction towards the singulation post. In some embodiments, a computer records weight measurements recorded by the load cell. In such embodiments, the computer may be separate from, attached to, or integrated with the container weighing apparatus.

In one embodiment, the container weighing apparatus weighs one or more containers secured in a receptacle. A stage of the container weighing apparatus is aligned with a singulation post of the container weighing apparatus. The stage supports the receptacle securing the one or more containers. The singulation comprises a vertical element positioned below the stage. The stage is translated in a downward vertical direction towards the singulation post. As the stage is translated in the downward vertical direction, the vertical element of the singulation post contacts the single one of the containers and a single one of the containers is displaced by the singulation post in an upward vertical direction. The weight of the single containers displaced by the singulation post is measured by a load cell while the vertical element of the singulation post contacts the container and is stored.

BRIEF DESCRIPTION OF THE DRAWINGS

FIG. 7 is a flowchart illustrating a method of weighing containers, according to one embodiment.

Figure 1:
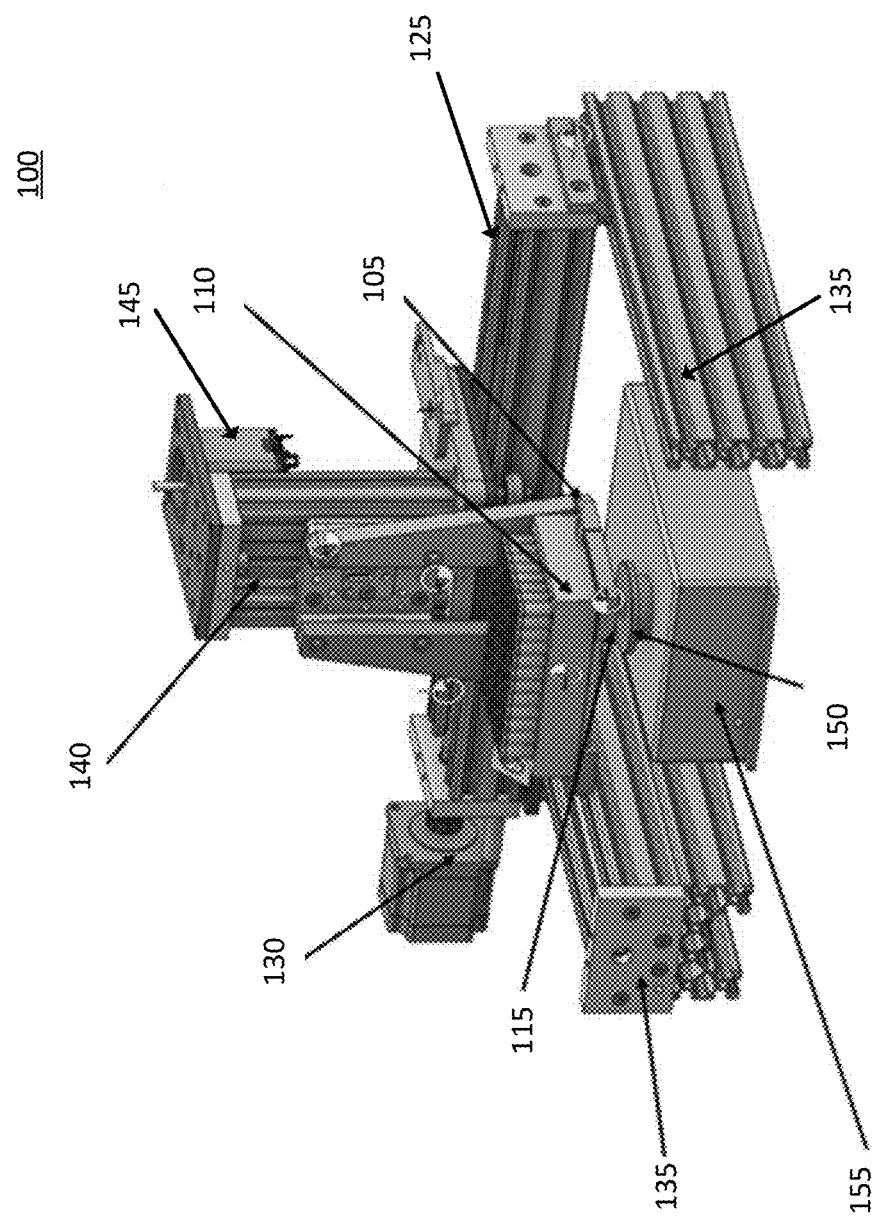
FIG. 1 is a perspective view of a container weighing apparatus, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

A container weighing apparatus and method, as described herein, automatically weigh individual containers without requiring that these containers be removed out of their receptacles. Each container is able to be weighed within its receptacle or holder, so the containers can be efficiently weighted in place. As a result, the disclosed container weighing apparatus minimizes the risk of dropping individual containers, breaking the containers, losing samples within the containers, and returning containers to the wrong compartment in the receptacle. The disclosed container weighing apparatus also minimizes the operation time needed to measure a container or a sample within a container because it avoids individually moving each container to a separate weighing device.

In embodiments described below, the container weighing apparatus supports a receptacle or holder that holds one or more containers that may contain samples. For example, it may include a stage for supporting a receptacle securing one or more containers. In addition, it can include an element for separating the container from the receptacle. For example, this element may be a singulation post aligned with a container secured in the receptacle. The singulation post may sit below the receptacle. The singulation post can separate the container from the receptacle. For example, it may elevate the container some distance from the receptacle so that the container is no longer resting on the receptacle. In one embodiment, the container is elevated by actuating the stage toward the singulation post. A controller of the container weighing apparatus, for example, may actuate the stage in a downward vertical direction towards the singulation post such that the singulation post displaces the container within the receptacle in an upward vertical direction. The singulation post may contact the bottom of the container and may push the container upward until it is resting only on the singulation post and is not resting on or contacting the receptacle. The singulation post is coupled to a load cell, which measures the weight of the displaced container while the container is in contact with the singulation post. A computer of the container weighing apparatus records the weight of the container measured by the load cell. The computer may be communicatively coupled but physically separate from the container weighing apparatus or may be integrated into the container weighing apparatus.

Although embodiments of the container weighing apparatus described herein are described with reference to containers (e.g., tubes or vials), a person having ordinary skill in the art would appreciate that the container weighing apparatus described herein may be applied to weigh any container or any object. Similarly, the container or object may be held by any type of receptacle or holder or rack (e.g., test tube or vial rack). Additionally, although embodiments of the container weighing apparatus are described with reference to measuring weight, a person having ordinary skill in the art would appreciate that the apparatus could be applied to measure other properties or perform other interrogations of a container or a sample within a container.

Container Weighing Apparatus

FIG. 1 is a perspective view of a container weighing apparatus 100, according to one embodiment. The apparatus includes a stage 105 that holds a receptacle 110 that includes containers, a singulation post 115, an x-axis track 125, an x-axis actuator 130, a y-axis track 135, a y-axis actuator (not shown), a z-axis track 140, a z-axis actuator 145, a weighing tray 150, and a load cell 155. In other embodiments, the invention may include more, fewer, or different components than those show in FIG. 1.

In the illustrated embodiment, the container weighing apparatus 100 comprises a stage 105. The stage 105 is a platform configured to support a receptacle 110. In some embodiments, the stage 105 is a flat platform or plate that supports the receptacle 110. In other embodiments, the stage 105 may be any platform or surface suitable for supporting a container or a receptacle of containers. In some embodiments, there may be no receptacle, and the stage 105 supports the container directly. In the embodiment illustrated in FIG. 1, the stage 105 is rectangular and approximately the size of the receptacle 110. In other embodiments, the stage 105 may be any shape or size suitable for supporting the receptacle 110. For example, the stage may be larger or smaller than the receptacle 110. It may have a shape that is designed for multiple different types of receptacles, including a round or square shape. It may also be designed in some embodiments to be adjustable to increase or decrease the size, or to change the shape, by sliding one or more components of the platform.

The receptacle 110 is configured to hold or secure one or more containers. For example, the receptacle 110 may be a holder or tube rack. The receptacle 110 is removable from the stage 105 and may be placed on the stage manually by a user or robot. In some embodiments, the receptacle 110 is configured with compartments for securing individual containers within each compartment. Additionally, each compartment within the receptacle 110 has a top opening exposing a top surface of a container secured within the compartment and a bottom opening beneath the container. The bottom opening of each compartment is small enough to expose part of the bottom surface of the container while preventing the container from falling through the bottom opening. In some embodiments, the containers may rest on the receptacle 110 by a lip on the upper portion of the container that sits on a surface of the receptacle 110 to suspend the container in the compartment. In other embodiments, the receptacle 110 may have the design shown in FIG. 1 where the bottom of the container sits on the receptacle 110, but there is an opening at the bottom of the receptacle 110 such that the base of the container can be contacted through the receptacle 110 by the singulation post 115. Any other type of design for a receptacle 110 is also possible where a bottom portion of a container in the receptacle 110 can be contacted by the singulation post 115.

The container weighing apparatus 100 further comprises a singulation post 115. The singulation post 115 includes a vertical element (not shown) and a head (not shown). The container weighing apparatus 100 actuates the stage 105 in two horizontal planes of motion (hereafter referred to as the x-axis and the y-axis) to align the singulation post 115 with a particular container within the receptacle 110. The container weighing apparatus 100 actuates the stage 105 in a vertical plane of motion (hereafter referred to as the z-axis) to translate the stage 105 in a downward towards the singulation post 115. As will be further discussed below, the translation of the stage 105 towards the singulation post 115 brings the singulation post 115 into contact with the bottom surface of a container aligned with the singulation post 115. Accordingly, the bottom opening of each compartment in the receptacle 110 is also wide enough for the singulation post 115 to pass through. As the container weighing apparatus 100 continues translating the stage 105 in the downward vertical direction, the singulation post 115 displaces the aligned container in an upward vertical direction by pushing the container out of its compartment within the receptacle 110. The singulation post 115 displaces the container by elevating the container so that is no longer rests on the bottom surface of the receptacle 110. Because the singulation post 115 only contacts the aligned container, the singulation post 115 displaces the aligned container without disturbing other containers secured in the receptacle 110.

To align an individual container within the receptacle 110 with the singulation post 115, a controller (not shown in FIG. 1) of the container weighing apparatus 100 actuates the stage 105 horizontally along the x-axis and the y-axis, before translating it vertically along the z-axis towards the singulation post 115. The container weighing apparatus 100 is configured with an x-axis track 125, an x-axis actuator 130, a y-axis track 135, a y-axis actuator (not shown), a z-axis track 140, and a z-axis actuator 145. The combination of each actuator and the corresponding track enables the movement of the stage 105 in the corresponding plane. The x-axis track 125 enables the translation of the stage 105 horizontally across the x-axis, and the x-axis actuator 130 actuates the movement of the stage 105 horizontally along the x-axis track 125. The y-axis track 135 enables the translation of the stage 105 horizontally across the y-axis, and the y-axis actuator actuates the movement of the stage 105 horizontally along the y-axis track 135. The z-axis track 140 enables the translation of the stage 105 vertically across the z-axis, and the z-axis actuator 145 actuates the movement of the stage 105 vertically along the z-axis. Each of the x-axis, y-axis, and z-axis actuators may be hydraulic actuators, magnetic actuators, electric actuators, electromagnetic actuators, or any other type of actuator compatible with the respective tracks 125, 135, and 140. In some embodiments, each of the x-axis, y-axis, and z-axis actuators are configured with linear encoders to more accurately position each actuator along the corresponding track. The controller is a device or a computer communicatively coupled to the x-axis actuator 130, the y-axis actuator, and the z-axis actuator 145 to control movements of the actuators along the corresponding tracks. The controller is illustrated in and further described with reference to FIG. 2.

The singulation post 115 extends from a weighing tray 150. The weighing tray 150 is secured to a load cell 155. The weighing tray 150 is a hardware interface between the singulation post 115 and the load cell 155. When the singulation post 115 is in contact with the displaced container, the load cell 155 measures a force exerted by the displaced container (e.g., compression, pressure) and converts the measured force into a weight measurement. The load cell 155 is an analytical scale that provides accurate and repeatable gravimetric measurements. In some embodiments, the load cell 155 measures the total weight of the container and its contents based on the force exerted by the displaced container. In other embodiments, the load cell 155 measures the weight of a sample within the container by subtracting a known weight of the empty container. Because the singulation post 115 is able to displace the container such that the container does not contact any surfaces of the receptacle 110, the load cell 155 accurately measures the weight of the container or the sample within the container. In some embodiments, the container weighing apparatus 100 may comprise differently sized singulation posts, which may be used for weighing different containers or for use with different receptacles. In some embodiments, the container weighing apparatus 100 may comprise more than one singulation post and more than one load cells for weighing more than one container. For example, the container weighing apparatus may implement multiple singulation posts and multiple load cells to measure a total sample weight across multiple containers.

In some embodiments, the measurements or weights measured are each stored in a memory of the apparatus 100, or can be transmitted to another device (a separate computer or laptop, a mobile device or phone, etc.) or to the cloud for storage. The apparatus 100 may also have a display that allows the user to interact with the apparatus, and program it for taking measurements of the containers. In other embodiments, the user interacts with the apparatus 100 through a separate computer that provides instructions to the apparatus.

Figure 2:
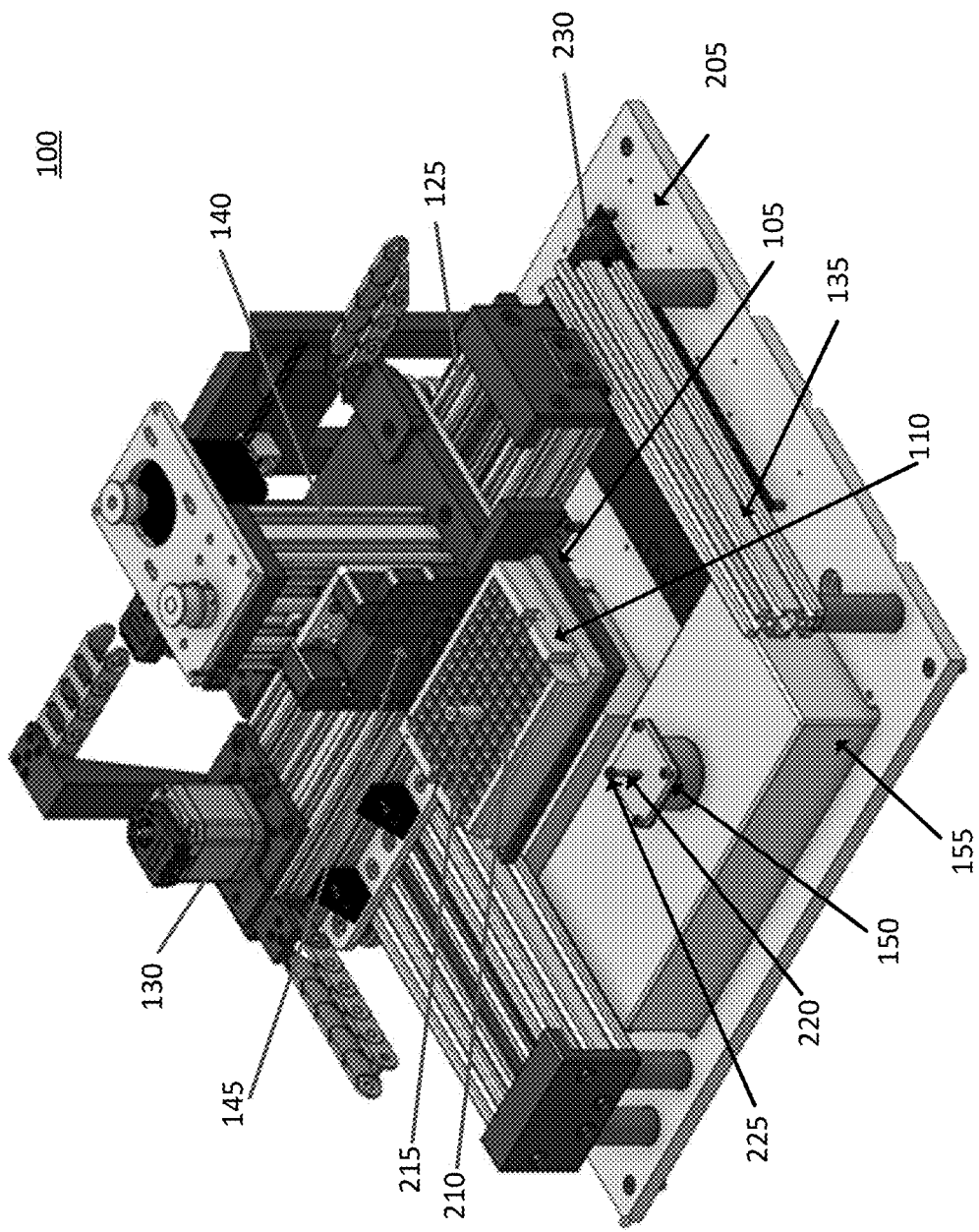
FIG. 2 is a perspective view of a container weighing apparatus configured with a base plate, according to one embodiment.

FIG. 2 is a perspective view of the container weighing apparatus 100 configured with a base plate, according to one embodiment. As illustrated in FIG. 2, the container weighing apparatus 100 (as described with regards to FIG. 1) may be mounted or secured to a base plate 205, for example to assist in transporting or storing the apparatus 200. Additionally, consistent with the description above, the receptacle 110 includes multiple compartments 210, within which containers may be placed, for example the container 215.

As noted above, the singulation post 115 comprises a vertical element 220 and a head 225. The vertical element 220 extends perpendicular to the weighing tray 150. In some embodiments, the vertical element 220 of the singulation post 115 is long enough to displace a container to a threshold height that clears features in the receptacle 110 without ejecting the container from the receptacle 110. For example, the vertical element 220 of the singulation post 115 may be long enough to push a container out of contact with the edges of its compartment in the receptacle 110. In other embodiments, the controller 230 adjusts the distance that the stage 105 is translated based on the length of vertical element 220 to ensure that the container is not displaced farther than the threshold height. Accordingly, as the singulation post 115 displaces a container, the container is not ejected from the receptacle 110. The threshold height may be defined manually by a user of the container weighing apparatus 100. Alternatively, the threshold height may be determined computationally based on the geometric specifications of the receptacle 110 and the containers within the receptacle 110, for example using a trained machine-learning model.

One end of the vertical element 220 is coupled to weighing tray 150. The opposite end, the head 225, contacts the container as the stage 105 is translated towards the singulation post 115. In the illustrated embodiment, the head 225 is shaped like a circle, but the head 225 may be designed using any shape suitable for displacing the base of the container. The head 225 has a contact surface configured to contact a bottom surface of an aligned container, for example the base of the container, to displace the container in the vertical direction. In some embodiments, the contact surface of the head 225 is a flat surface. In other embodiments, the contact surface may be curved or pointed.

Consistent with the description above of FIG. 1, the controller 230 actuates the x-axis actuator 130 to move along the x-axis track 125, the y-axis actuator to move along the y-axis track 135, and the z-axis actuator 145 to move along the z-axis track 140. FIG. 2 illustrates the controller 230 mounted to the base 205. As discussed above, the controller 230 positions the stage 105 along the x-axis and y-axis to align the singulation post 115 with a container 215 and translates the stage 105 along the z-axis to displace the container 215 for measurement. For example, the controller 230 actuates the x-axis actuator 130 to move along the x-axis track 125 to align the singulation post 115 with a container in a particular row of the receptacle 110. As another example, the controller 230 actuates the y-axis actuator to move along the y-axis track 135 to align the singulation post 115 with a container in a particular column of the receptacle 110. In some embodiments, the singulation post 115 actuates both the x-axis actuator 130 and the y-axis actuator to align a particular container with the singulation post 115. The controller 230 positions the stage 105 using the x-axis actuator 130 and the y-axis actuator such that a particular container in the receptacle 110 is located above the singulation post 115. The controller 230 receives instructions identifying which containers in the receptacle 110 are to be weighed and actuates the x-axis actuator 130 and y-axis actuator to sequentially position each container identified in the instructions above the singulation post 115. In some embodiments, the instructions identify every container in the receptacle 110, a subset of containers in the receptacle 110, or a single container in the receptacle 110 (e.g., any number from 1 to the maximum number of containers that can be secured in the receptacle 110). In some embodiments, the instructions further describe a sequence in which the identified containers are to be weighed or a pattern for weighing the containers. For example, the pattern may include weighing each container in a line along the short axis or long axis of the receptacle 110. At the end of each line, the pattern may include returning to the top of the next line or starting at the bottom of the next line and moving in the opposite direction up the line.

The instructions may be computer-readable instructions or computer code that is stored in a memory or computer-readable storage medium of a computer. The stored instructions or code may be executed by a processor of the computer.

The instructions may be generated manually by an operator interacting a with a graphical user interface to set or approve measurements of each container. For example, the operator may wish to have the containers in a receptacle weighed in a particular order, and so may program the apparatus 100 to weigh containers in the receptacle in that specified order. In other embodiments, the instructions may be generated automatically using any suitable technology, for example image processing techniques or sensors integrated into the apparatus 100. The automatic instructions may include following any of various pre-set weighting patterns. In some embodiments, the apparatus 100 detects which compartments in a receptacle have containers (e.g., in implementations where not all the compartments are filled), and only aligns the stage 105 based on locations of compartments holding containers. The controller 230 moves the actuators along the respective tracks to position and weigh each container according to the received instructions.

For example, the controller 230 may receive instructions to weigh a first container in the right corner of the receptacle 110 and a second container to the left of the first container. After weighing the first container, the controller 230 may actuate the x-axis actuator 130 to move right such that the second container is aligned with the singulation post 115 and positioned where the first container was previously. As another example, the controller 230 may receive instructions to weigh a first container the lower right corner of the receptacle 110 and a second container behind it in the same column. After weighing the first container, the controller 230 may actuate the y-axis actuator to move the receptacle 110 forward such that the second container is aligned with the singulation post 115 and positioned where the first container was previously.

Once the controller 230 aligns a particular container in the receptacle 110 with the singulation post 115, the controller 230 actuates the z-axis actuator 145 to move the stage 105 along the z-axis track 140 in the downward vertical direction towards the singulation post 115. In one embodiment, the controller 230 translates the z-axis actuator 145 downward until the aligned container rests atop the singulation post 115. The singulation post 115 may be pressure-sensitive and may transmit a signal to the controller 230 indicating contact with a container. After verifying that the singulation post 115 has contacted the correct container, the controller 230 continues translating the z-axis actuator 145 in the downward vertical direction until the singulation post 115 displaces the container to the threshold height above the receptacle 110. In some embodiments, the threshold height may be a small amount. For example, it may be a few millimeters or a few centimeters or an inch or two above the receptacle surface. It may also be a distance such that the container is barely avoiding touching the bottom surface of the receptacle 110.

Once the load cell 155 measures the weight of a container or the sample within the container, a computer records and/or stores the measured weight in computer memory. The controller 230 actuates the z-axis actuator 145 to move along the z-axis track 140 in the upward vertical direction until the singulation post 115 no longer contacts the container and the container again rests within the compartment of the receptacle 110. If the controller 230 has instructions to measure another container in the receptacle 110, the controller 230 repeats the process described above to align the next container with the singulation post 115 using the x-axis actuator 130 and the y-axis actuator before again translating the stage 105 towards the singulation post 115 using the z-axis actuator 145.

In some embodiments (not shown), the controller 230 moves the singulation post 115 along one or more of the x-axis, y-axis, or z-axis to align the singulation post 115 with a particular container in the receptacle 110. In other embodiments, the controller 230 moves both the singulation post 115 and the stage 105 to align the singulation post 115 and a particular container in the receptacle 110. In embodiments where the controller 230 translates the singulation post 115, the container weighing apparatus 100 additionally includes actuators for moving the singulation post 115 along the tracks 125, 135, and 140. In some embodiments, the container weighing apparatus 100 may additionally include a separate set of tracks for actuating the singulation post 115. In some embodiments, the controller 230 may translate the singulation post 115, the weighing tray 150, and the load cell 155 as a unit.

In some embodiments (not shown), the container weighing apparatus 100 comprises multiple singulation posts and multiple load cells. In such embodiments, the controller 230 may position the stage 105 to align multiple containers within the receptacle 110 with the multiple singulation posts. Each singulation post is coupled to an individual load cell such that the coupled load cell measures the weight of a container contacted by the singulation post. As the controller 230 actuates the stage 105 in the downward vertical direction towards the singulation posts, the singulation posts simultaneously displace the multiple containers such that each coupled load cell simultaneously measures the weight of each displaced container.

In some embodiments, the controller 230 is further configured to vibrate the stage 105 to loosen any adhesion between a container in the receptacle 110 and a surface of the receptacle 110, for example adhesion caused by a leaked sample or residue left from when the receptacle was last cleaned. In other embodiments, the controller 230 vibrates the stage 105 to loosen adhesion between multiple containers in the receptacle 110 and any surfaces of the receptacle 110.

In some embodiments, the container weighing apparatus is configured with an anti-static fan (not shown) that may be activated to remove static as the receptacle 110 is placed on the stage 105 and secured within the container weighing apparatus 100.

Figure 3A:
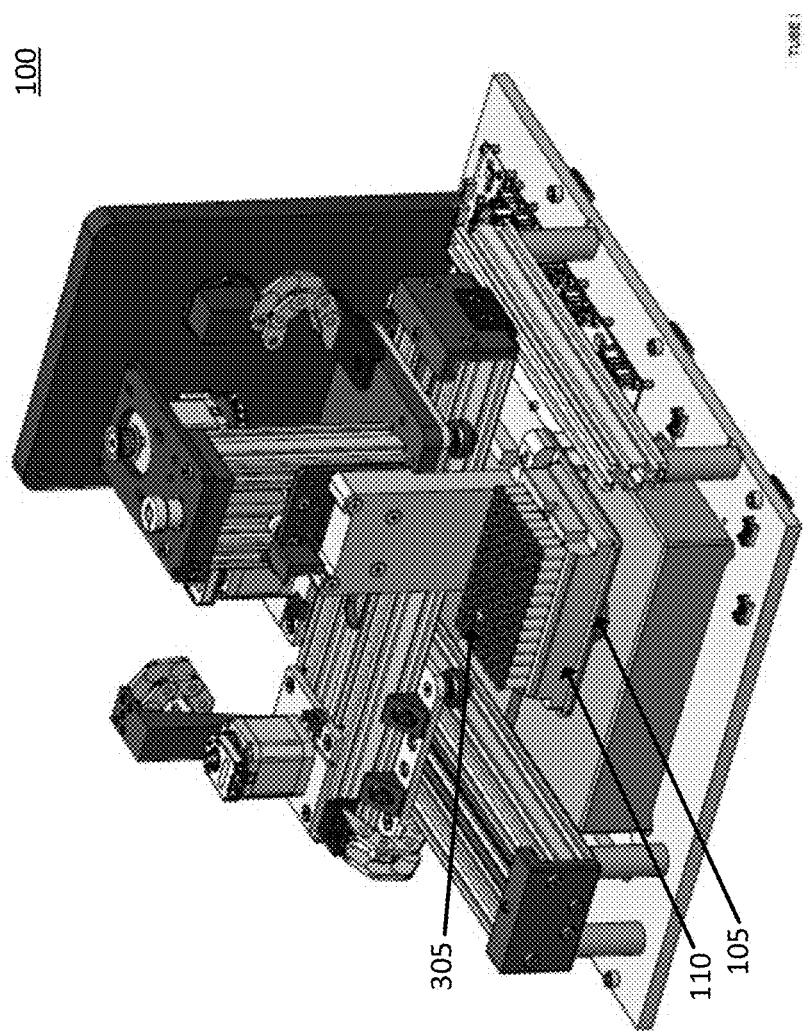
FIG. 3A is a perspective view of a container weighing apparatus as a container is being weighed, according to one embodiment.

FIG. 3A is a perspective view of the container weighing apparatus 100 as a container is being weighed, according to one embodiment. In FIG. 3A, each compartment of the receptacle 110 holds a container, but a measured container 305 rests at a height above other containers in the receptacle 110. In the illustrated embodiment of FIG. 3A, the stage 105 is positioned to align the measured container 305 with the singulation post 115. As the controller 230 translates the stage 105 downward in the vertical direction, the singulation post 115 displaces the measured container 305 upwards in the vertical direction, elevating the measured container 305 to a height above other containers in the receptacle 110.

Figure 3B:
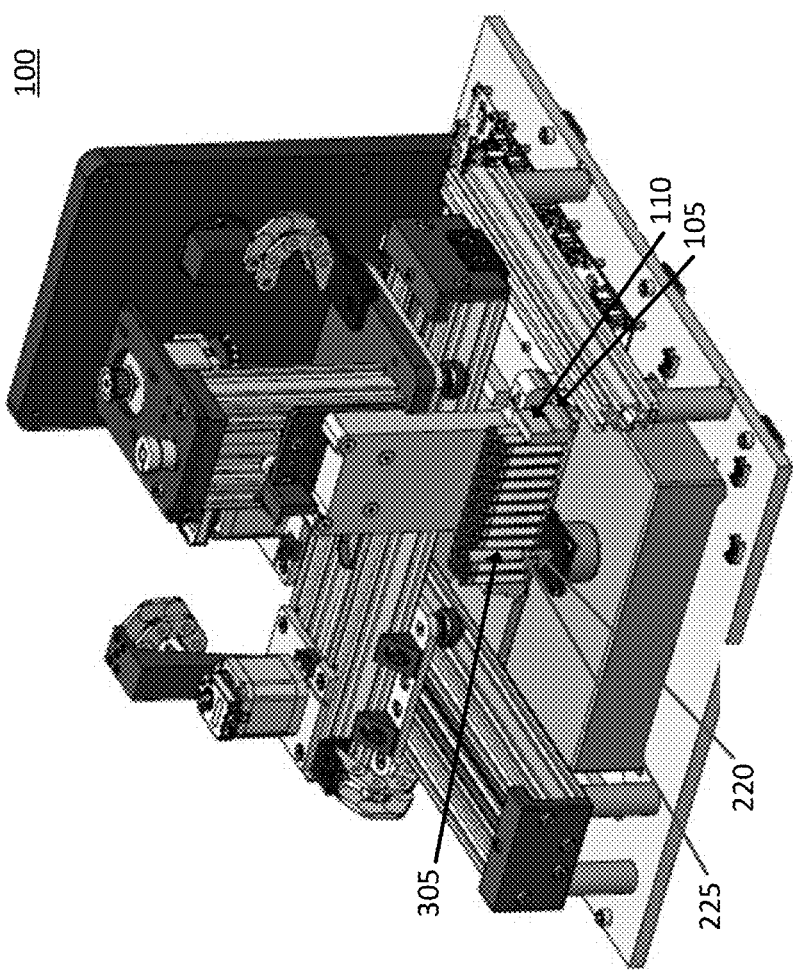
FIG. 3B is a view of a cross-section across the z-axis of the container weighing apparatus as the container is being weighed, according to one embodiment.

FIG. 3B is a view of a cross-section across the z-axis of the container weighing apparatus as the container is being weighed, according to one embodiment. Continuing from the container weighing apparatus illustrated in FIG. 3A, the cross-section illustrates the contact between the measured container 305 and the singulation post 115 (in particular the head 225) as the measured container 305 is displaced by the singulation post 115. In the illustrated embodiment, the vertical element 220 extends through the bottom opening of the compartment holding the measured container 305 such that the head 225 contacts a bottom surface of the measured container 305. As the controller 230 continues to translate the stage 105 downwards in the vertical direction, the vertical element 220 extends further through the bottom opening and the head 225 (in contact with the bottom surface of the container 305) pushes the measured container 305 higher in the vertical direction.

Figure 3C:
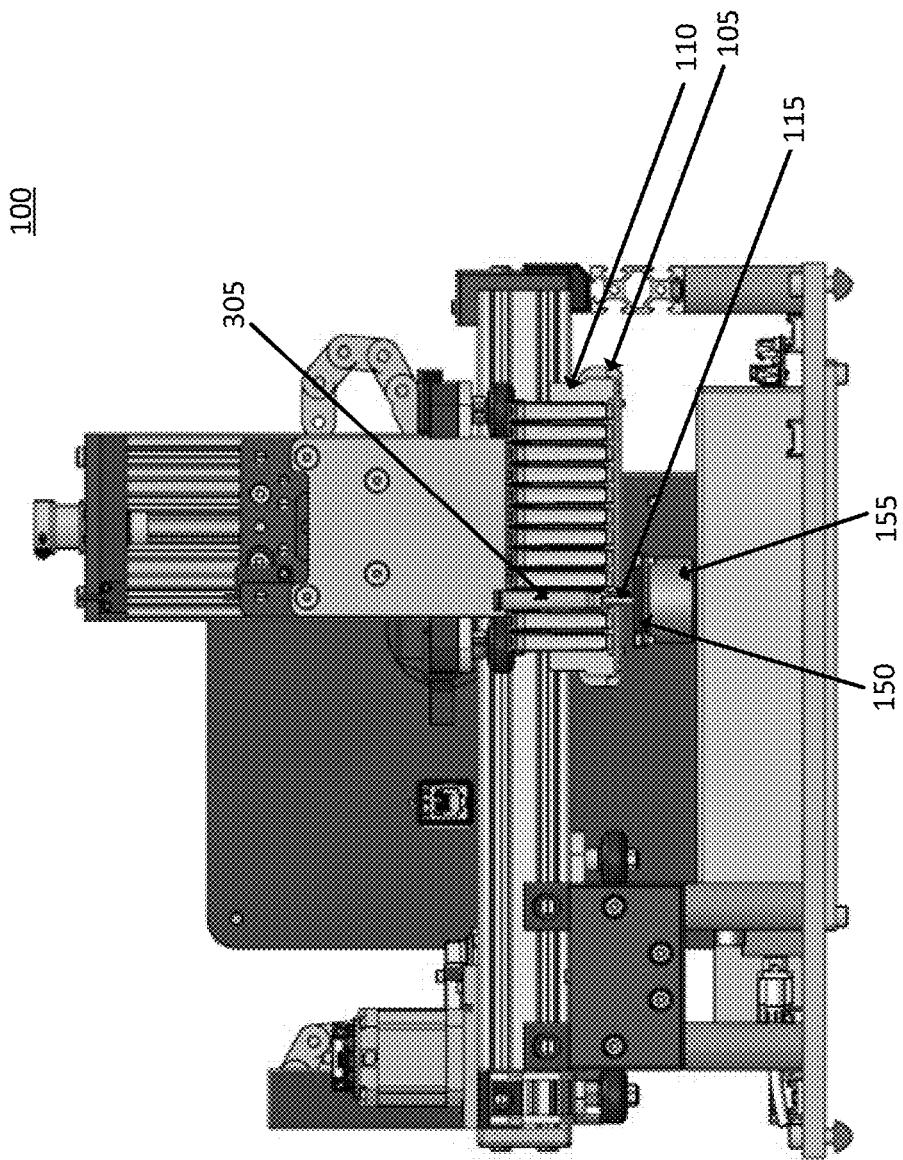
FIG. 3C is a side view of the container weighing apparatus as the container is being weighed, according to one embodiment.

FIG. 3C is a side view of the container weighing apparatus as the container is being weighed, according to one embodiment. Consistent with the description in FIG. 3B, the singulation post 115 extends through a bottom opening of the receptacle 110 as the stage 105 is translated downwards in the vertical direction towards the singulation post 115. The singulation post 115 contacts a bottom surface of the measured container 305 and elevates the bottom surface upwards the in vertical direction as the stage 105 continues to be translated downwards.

Figure 4A:
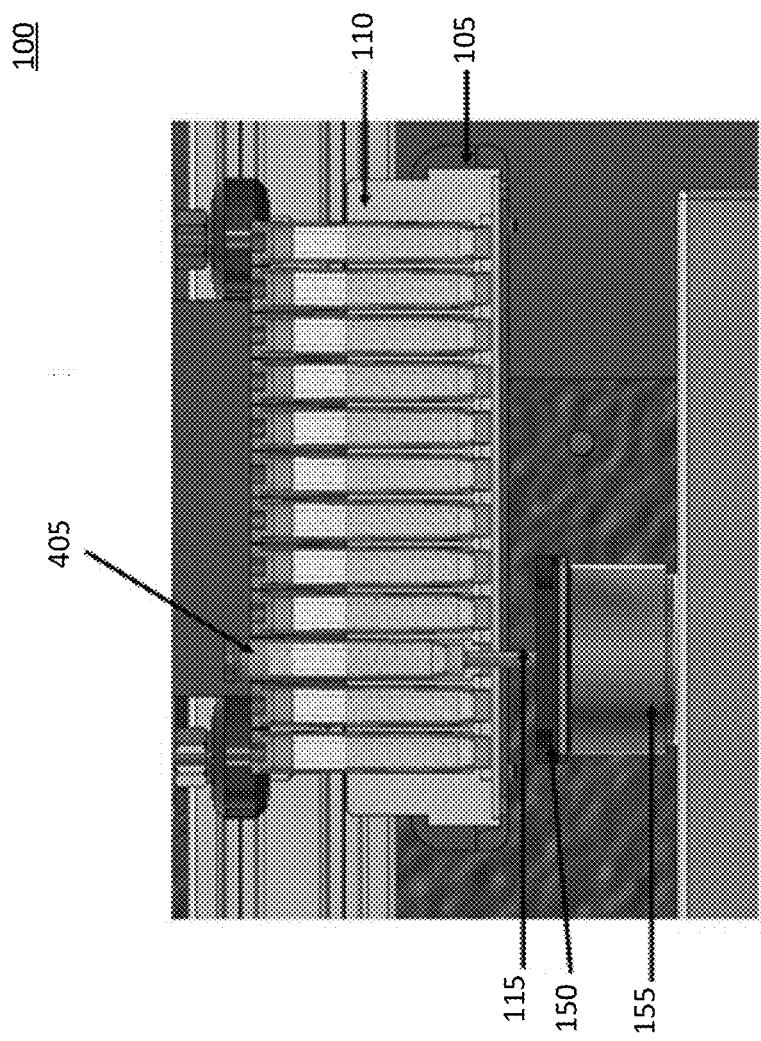
FIG. 4A is cross-section illustrating a singulation post displacing a single container in a vertical direction, according to one embodiment.

FIG. 4A is cross-section illustrating a singulation post displacing a single container in a vertical direction, according to one embodiment. As discussed above with regards to FIG. 1 and FIG. 3B, the singulation post 115 displaces the measured container 405 by pushing the measured container 405 upwards in the vertical direction as the stage 105 is translated downwards in the vertical direction. By pushing the measured container 405 upwards, the singulation post 115 elevates the measured container 405 above other containers in the receptacle 110. Additionally, by pushing the measured container 405 upwards, the singulation post 115 elevates the measured container 405 so that it no longer rests on the bottom surface of the receptacle 110.

Figure 4B:
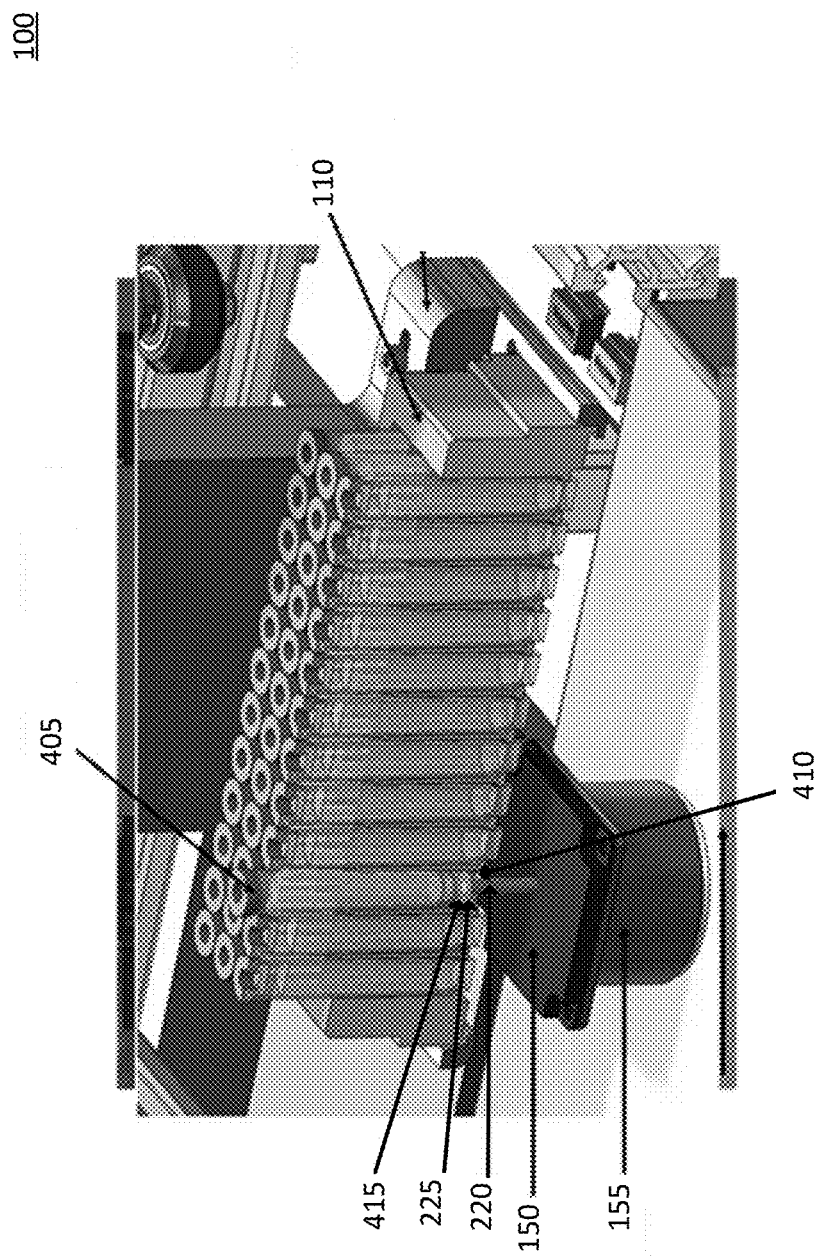
FIG. 4B is a perspective view of a cross-section illustrating a singulation post displacing a single container in a vertical direction, according to one embodiment.

FIG. 4B is a perspective view of a singulation post of the container weighing apparatus 100 displacing a single container in a vertical direction, according to one embodiment. Consistent with the description in FIG. 4A, the singulation post 115 displaces the measured container 405 by pushing the measured container 405 upwards in the vertical direction as the stage 105 is translated downwards in the vertical direction. Each compartment of the receptacle 110 is configured with a bottom opening 410 that is wide enough for the singulation post 115 to enter but narrow enough to prevent the container 405 from slipping through. Accordingly, each bottom opening 410 is wider than or at least as wide as the widest element of the singulation post 115. In the embodiment illustrated in FIG. 4B, head 225 of the singulation post 115 is wider than the vertical element 220 of the singulation post 115. As a result, the bottom opening 410 is wider than or at least as wide as the head 225. In other embodiments (not shown), the vertical element 220 may be wider than the head 225 of the singulation post 115, for example where the head is a pointed tip. In such embodiments, each bottom opening 410 is wider than or at least as wide as the vertical element 220. As the singulation post 115 extends through the bottom opening 410, the contact surface 415 of the head 225 contacts a bottom surface of the measured container 405. As the vertical element 220 extends further through the bottom opening 410, the contact surface 415 pushes against the bottom surface of the container 405, elevating the container 405 away from a bottom surface of the receptacle 110 and above other containers in the receptacle 110.

Figure 5A:
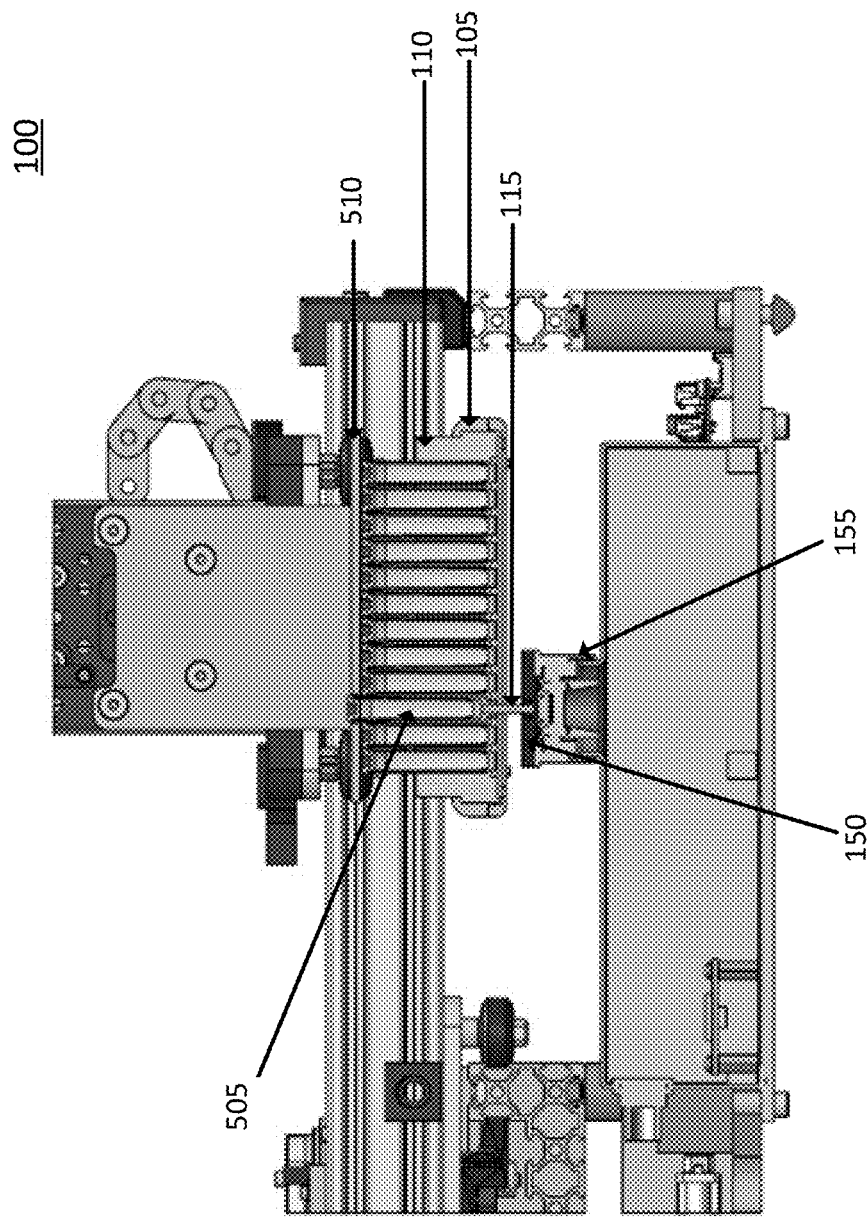
FIG. 5A is a side view of a cross-section of a container weighing apparatus configured with an isolation tray, according to one embodiment.

FIG. 5A is a side view of a cross-section of a container weighing apparatus 100 configured with an isolation tray, according to one embodiment. The container measuring apparatus 100 may further include an isolation tray 510 shown in the figure to isolate a container for weighing. The isolation tray 510 is positioned above the receptacle 110. The isolation tray 510 assists the singulation post 115 with displacing a particular container (e.g., the measured container 505) without affecting any adjacent containers in the receptacle 110.

Figure 5B:
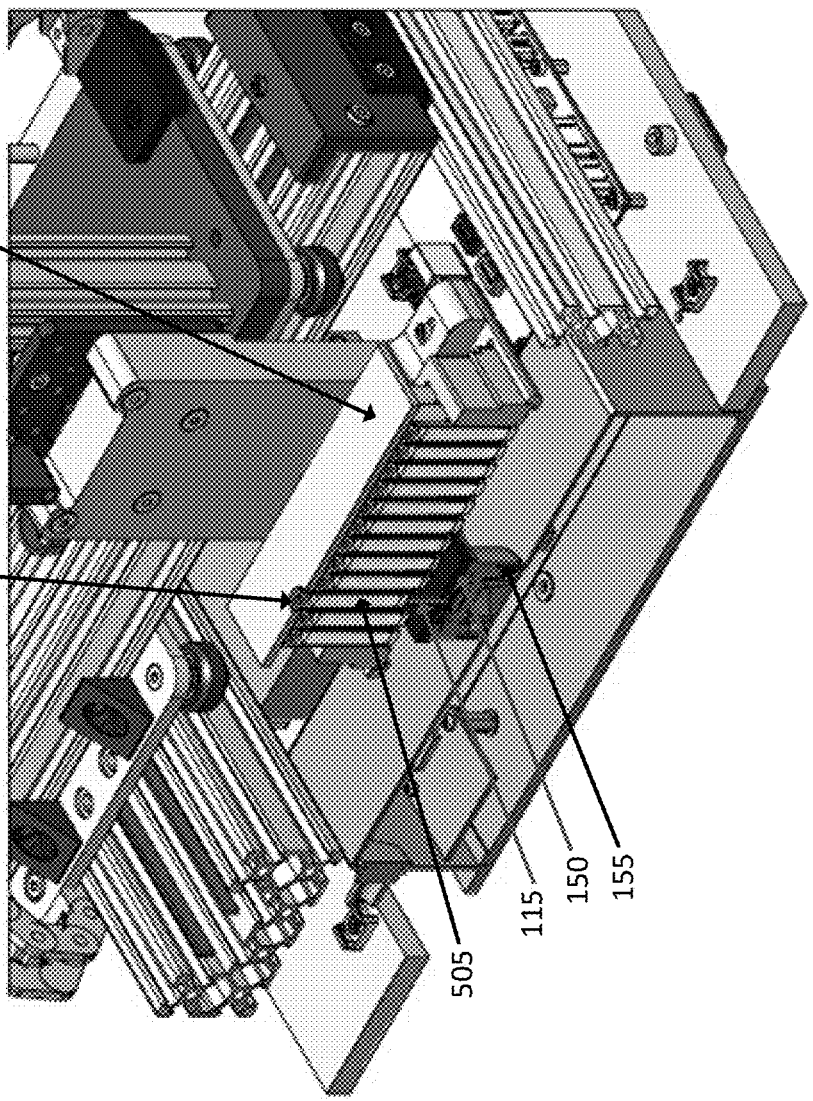
FIG. 5B is a perspective view of a cross-section of a container weighing apparatus configured with an isolation tray, according to one embodiment.

FIG. 5B is a perspective view of a cross-section of a container weighing apparatus 100 configured with an isolation tray, according to one embodiment. The isolation tray 510 is configured with an opening 515 wide enough for a container displaced by the singulation post 115 (e.g., the measured container 505) to pass through as the singulation post 115 pushes the container 505 in the upward vertical direction. The isolation tray 510 is further configured to cover one or more containers within the receptacle 110 surrounding the displaced container (e.g., the measured container 505). In the embodiment illustrated in FIG. 5A and FIG. 5B, the isolation tray 510 covers the entire receptacle 110, but in other embodiments the isolation tray 510 covers only a subset of containers adjacent to displaced container. Because the isolation tray 510 is configured with a single opening 515 aligned with the measured container 505, the isolation tray 510 prevents other containers in the receptacle 110 from being displaced in the upward vertical direction, for example due to adhesion with the measured container 505 or misalignment between the singulation post 115 and the measured container 505.

In some embodiments, the isolation tray 510 is mounted in a fixed position in the x-axis and the y-axis (e.g., fixed x-y position) such that the opening 510 is aligned with the singulation post 115. The controller 230 may move the stage 105 (as discussed above) to align the measured container 505 with both the singulation post 115 and the isolation tray 510. In other embodiments, the controller 230 may move the isolation tray 510 along one or more of the x-axis, y-axis, or z-axis to align the opening 515 with a particular container in the receptacle 110. In other embodiments, the controller 230 moves the isolation tray 510 and the stage 105 to align the opening 515 and the measured container 505. In embodiments where the controller 230 translates the isolation tray 510, the container weighing apparatus 100 additionally includes actuators for moving the isolation tray 510 along the tracks 125, 135, and 140. In some embodiments, the container weighing apparatus 100 may additionally include a separate set of tracks for actuating the isolation tray 510.

Figure 6:
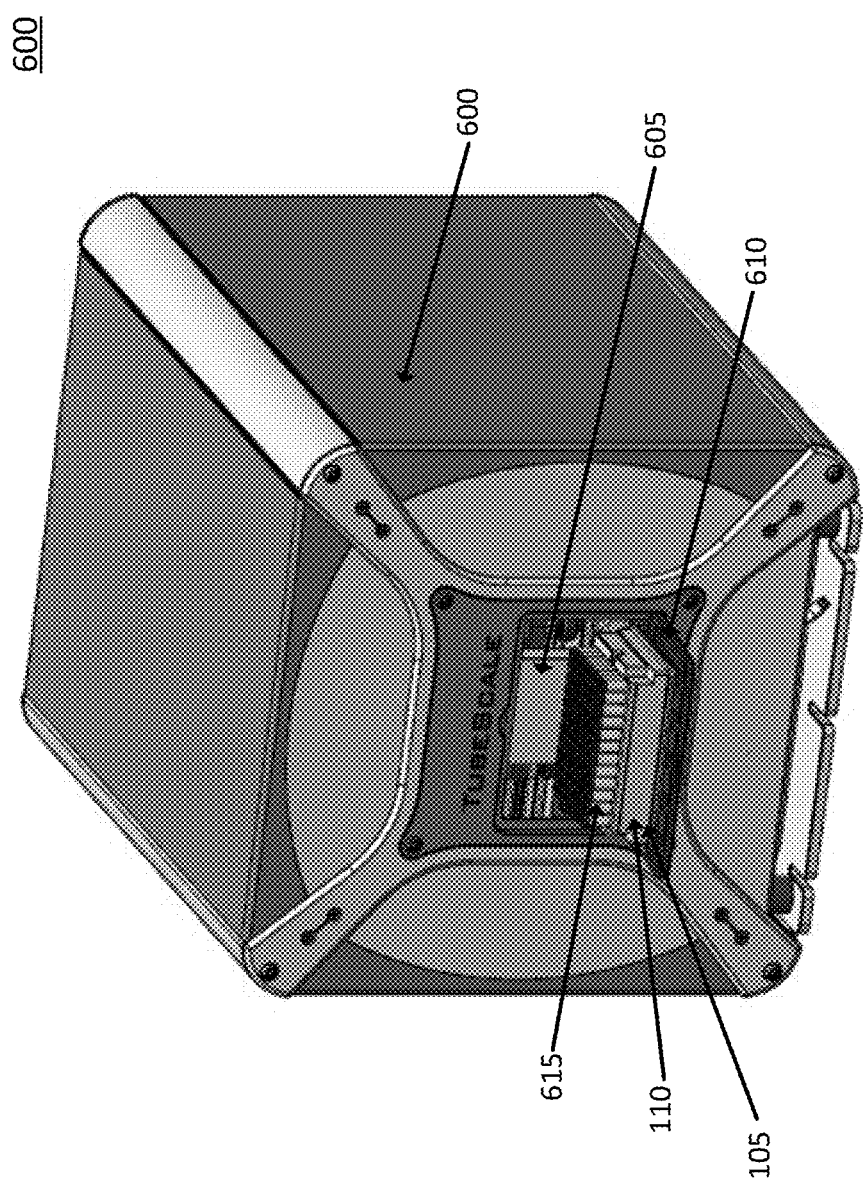
FIG. 6 is a perspective view of a protective housing encasing the container weighing apparatus, according to one embodiment.

FIG. 6 is a perspective view of a protective housing 600 encasing a container weighing apparatus, according to one embodiment. The protective housing 600 surrounds the container weighing apparatus, for example the container weighing apparatus illustrated in FIGS. 1 and 2. The protective housing 600 protects the container weighing apparatus from environmental factors that may affect measurements taken by the container weighing apparatus 100, for example weight measurements measured by the load cell 155. For example, drafts from wind, air, or HVAC vents may significantly disturb weight measurements taken by the load cell 155. The container weighing apparatus 100 may be removably secured within the protective housing 600 such that the protective housing 600 may be removed as necessary to clean and maintain the container weighing apparatus 100.

The protective housing 600 is configured with a cavity 605 from which a user may access a receptacle 110 secured on the stage 105 of the container weighing apparatus 100. The cavity 605 is secured by a cavity door 610. A user may open the cavity door 610 to access the receptacle 110 or containers 615 secured within the receptacle 110, or the cavity door 610 may automatically open. In some embodiments, the stage 105 may extend outwards from the cavity 610 when the cavity door 615 is opened. When the stage 105 extends outwards from the cavity 610, a user may remove containers 615 from the receptacle 110 or add new containers 615 to the receptacle 110. A user may close the cavity door 610 while the container weighing apparatus 100 weighs containers 615 secured in the receptacle 110, or the cavity door 610 may automatically close. When the cavity door 610 closes, the cavity door 610 may create an airtight seal within the protective housing.

In embodiments where a robotic device or arm is placing the receptacle 110 onto the stage 105, the cavity door 610 may automatically open to accept the receptacle. The door may automatically close after the receptacle is placed. The stage 105 may move manually or automatically to slide the receptacle into the housing for the weighing process, and to slide the receptacle back out of the housing once the weighing in complete.

Method for Weighing Containers

FIG. 7 is a flowchart illustrating the method for weighing containers, according to some embodiments of the invention. In other embodiments, there may be more, fewer, or different steps that those listed in this figure. The steps described here are described in terms of an apparatus performing them, but any of the steps could alternatively be performed by a user. A container weighing apparatus, such as container weighing apparatus 100, aligns 705 a stage with a singulation post, for example using a controller of the container weighing apparatus 100. The stage supports a receptacle for securing one or more containers. In some embodiments, the singulation post comprises a vertical element positioned below the stage. As discussed above, the container weighing apparatus may align the stage with the singulation post by aligning the singulation post with a particular compartment of the receptacle securing a container to be measured. The container weighing apparatus translates 710 the stage into position to align the singulation post with the container to be weighed. For example, the apparatus may translate 710 the stage in a downward vertical direction towards the singulation post.

As the container weighing apparatus translates 710 the stage, the vertical element of the singulation post contacts a single container secured in the compartment of the receptacle aligned with the singulation post. The container weighing apparatus displaces 715 the single container for weighing. For example, the apparatus may displace 715 the container, using the vertical element of the singulation post, in an upward vertical direction as the stage is translated in the downward vertical direction, as described in detail above. The contact between the vertical element of the singulation post and the single container pushes the container upward until it rests only on the singulation post and does not rest on or contact the receptacle. This isolated, elevated container is then ready to be weighed.

The container weighing apparatus measures 720 a weight of the single container displaced by the singulation post. The weight measurement may be conducted using a load cell while the vertical element of the singulation post contacts the container, as described in detail above. The container weighing apparatus stores 725 weights measured by the load cell, for example in computer memory. The container weighing apparatus may repeat the steps illustrated in and described with reference to FIG. 7 any number of times based on the number of containers in the receptacle 110 to be measured.

Additional Configuration Considerations

Throughout this specification, plural instances may implement components, operations, or structures described as a single instance, and vice versa. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein.

Various modifications, changes and variations, which will be apparent to those skilled in the art, may be made in the arrangement, operation and details of the method and apparatus disclosed herein without departing from the spirit and scope defined in the appended claims.

What is claimed:

1. An apparatus for weighing containers, the apparatus comprising:
    a stage configured as a platform to support a receptacle for securing one or more containers;
    a first actuator for actuating the stage horizontally along an x-axis;
    a second actuator for actuating the stage horizontally along a y-axis;
    a third actuator for actuating the stage vertically along a z-axis;
    a singulation post comprising a vertical element positioned below the stage, wherein the singulation post is configured to be aligned with and to displace a single one of the containers within the receptacle in an upward vertical direction as the stage is translated in a downward vertical direction towards the singulation post;
    a load cell coupled to the singulation post, wherein the load cell is configured to measure a weight of the single one of the containers displaced by the singulation post while the vertical element of the singulation post contacts the container; and
    a controller for actuating the stage in the downward vertical direction towards the singulation post and for recording a weight of the container measured by the load cell,
    wherein the controller is configured to position the stage, using the first actuator and the second actuator, such that a particular container of the one or more containers is located above the singulation post, and wherein the controller is further configured to translate the stage towards the singulation post using the third actuator.

2. The apparatus of claim 1, wherein a base of the receptacle comprises openings beneath each container secured in the receptacle, each opening wide enough for the vertical element of the singulation post to contact the container and pass through the receptacle as the stage is translated towards the singulation post.

3. The apparatus of claim 1, further comprising:
    a first track for translating the stage horizontally along the x-axis, wherein the first actuator is designed to actuate the stage along the first track;
    a second track for translating the stage horizontally along the y-axis, wherein the second actuator is designed to actuate the stage along the second track; and
    a third track for translating the stage vertically along the z-axis, wherein the third actuator is designed to actuate the stage along the third track.

4. The apparatus of claim 1, wherein the singulation post comprises a head on the vertical element, the head having a contact surface configured to contact a lower portion of the container to displace the container in the vertical direction by elevating the container away from a surface of the receptacle.

5. The apparatus of claim 1, further comprising a plurality of singulation posts each coupled to a load cell of a plurality of load cells, wherein the controller is configured to actuate the stage in the downward vertical direction towards the plurality of singulation posts to simultaneously displace a plurality of containers secured in the receptacle such that each coupled load cell simultaneously measures a weight of a displaced container.

6. The apparatus of claim 1, further comprising an isolation tray positioned above the receptacle, wherein the isolation tray is configured to cover a subset of the secured containers surrounding the container displaced by the singulation post, and wherein the isolation tray comprises an opening wide enough for the container to pass through as the singulation post pushes the container in the upward vertical direction as the stage is translated towards the singulation post.

7. The apparatus of claim 1, wherein the controller is further configured to vibrate the stage to loosen adhesion between any of the one or more containers and a surface of the receptacle.

8. The apparatus of claim 1, further comprising a housing surrounding the apparatus, the housing configured to protect the apparatus from environmental factors affecting weight measurements, wherein the housing comprises a cavity configured to expose the receptacle for containers to be secured, replaced, or removed from the receptacle and retract the receptacle into the housing.

9. A method of weighing containers, the method comprising:
    aligning a stage with a singulation post, the stage supporting a receptacle for securing one or more containers and the singulation post comprising a vertical element positioned below the stage;
    positioning the stage such that a particular container of the one or more containers is located above the singulation post by actuating the stage horizontally along an x-axis and a y-axis;
    translating the stage in a downward vertical direction towards the singulation post by actuating the stage vertically along a z-axis;
    displacing, by the singulation post, a single one of the containers in an upward vertical direction as the stage is translated in the downward vertical direction, wherein the vertical element of the singulation post contacts the single one of the containers;
    measuring, by a load cell, a weight of the single one of the containers displaced by the singulation post while the vertical element of the singulation post contacts the container; and
    storing weights measured by the load cell.

10. The method of claim 9, wherein displacing the container in the upward vertical direction comprises contacting a lower portion of the of container with a contact surface of the vertical element of the singulation post to elevate the container away from a surface of the receptacle.

11. The method of claim 9, wherein the singulation post is one of a plurality of singulation posts each coupled to a load cell of a plurality of load cells, the method further comprising:

translating the stage in the downward vertical direction towards the plurality of singulation posts to simultaneously displace a plurality of containers secured in the receptacle; and simultaneously measuring, by each coupled load cell, a weight of each of the displaced containers.

12. The method of claim 9, wherein an isolation tray positioned above the receptacle covers a subset of one or more secured containers surrounding the container displaced by the singulation post and comprises an opening wide enough for the container displaced by the singulation post to pass through, the method further comprising:

pushing, by the singulation post, the displaced container in the upward vertical direction through the opening as the stage is translated towards the singulation post.

13. The method of claim 9, further comprising:

vibrating the stage to loosen adhesion between any of the one or more containers and a surface of the receptacle.

14. The method of claim 9, wherein a base of the receptacle comprises openings beneath each container secured in the receptacle, each opening wide enough for the vertical element of the singulation post to contact the container as the stage is translated towards the singulation post.

15. The method of claim 9, wherein the stage, the singulation post, and the load scale are encased in a housing that protects against environmental factors affecting weight measurements, the method further comprising:

exposing, by a cavity in the housing, the receptacle for containers to be secured or removed from the receptacle; and retracting, by the cavity, the receptacle into the housing once containers have been secured or removed.

16. An apparatus for weighing containers, the apparatus comprising:

a stage configured to support a receptacle for securing one or more containers, wherein a base of the receptacle comprises openings beneath each container secured in the receptacle;

a first actuator for actuating the stage horizontally along an x-axis;

a second actuator for actuating the stage horizontally along a y-axis;

a third actuator for actuating the stage vertically along a z-axis;

a singulation post having a vertical element, the singulation post comprising configured to be aligned with and to displace one of the containers within the receptacle as the stage is translated;

a load cell coupled to the singulation post, wherein the load cell is configured to measure a weight of the one of the containers displaced by the singulation post while the singulation post contacts the container; and a controller for actuating the stage in the downward vertical direction towards the singulation post, wherein the controller is configured to position the stage, using the first actuator and the second actuator, such that a particular container of the one or more containers is located above the singulation post, and wherein the controller is further configured to translate the stage towards the singulation post using the third actuator, each opening in the base of the receptable being wide enough for the vertical element to contact the container and pass through the receptacle as the stage is translated towards the singulation post, to elevate the container away from a surface of the receptacle.

17. The apparatus of claim 16, further comprising:

a first track for translating the stage horizontally along the x-axis, wherein the first actuator actuates the stage along the first track;

a second track for translating the stage horizontally along the y-axis, wherein the second actuator actuates the stage along the second track; and a third track for translating the stage vertically along the z-axis, wherein the third actuator actuates the stage along the third track.

\* \* \* \* \*

UNITED STATES PATENT AND TRADEMARK OFFICE
CERTIFICATE OF CORRECTION

| | | |
|---|---|---|
| PATENT NO. | : 12,436,022 B2 | Page 1 of 1 |
| APPLICATION NO. | : 18/090367 | |
| DATED | : October 7, 2025 | |
| INVENTOR(S) | : Matsumoto et al. | |

It is certified that error appears in the above-identified patent and that said Letters Patent is hereby corrected as shown below:

In the Claims

In Column 14, in Claim 10, Line 61, delete "portion of the of container" and insert -- portion of the container --, therefor.

Signed and Sealed this
Second Day of December, 2025

John A. Squires
*Director of the United States Patent and Trademark Office*